United States Patent [19]
Scott

[11] Patent Number: 5,964,912
[45] Date of Patent: *Oct. 12, 1999

[54] METHOD OF CONTROLLING GLASS FLOW THROUGH MULTIPLE ORIFICES UTILIZING RECIPROCATING PLUNGERS

[75] Inventor: Garrett L. Scott, Toledo, Ohio

[73] Assignee: Owens-Brockway Glass Container Inc., Toledo, Ohio

[*] Notice: This patent is subject to a terminal disclaimer.

[21] Appl. No.: 08/977,920

[22] Filed: Nov. 25, 1997

Related U.S. Application Data

[63] Continuation of application No. 08/686,640, Jul. 24, 1996, Pat. No. 5,693,114, which is a continuation of application No. 08/307,542, Sep. 16, 1994, Pat. No. 5,540,747, which is a continuation of application No. 08/048,636, Apr. 19, 1993, abandoned.

[51] Int. Cl.$^6$ .................................................... C03B 7/086
[52] U.S. Cl. ................................................................. 65/129
[58] Field of Search ............................. 65/126, 129, 221, 65/324, 325, 328, 330, 331, 362; 24/135 A, 135 R, 136 B

[56] References Cited

U.S. PATENT DOCUMENTS

| | | |
|---|---|---|
| 1,529,948 | 3/1925 | Freese . |
| 1,631,061 | 5/1927 | Rankin ........................................ 65/331 |
| 1,675,819 | 7/1928 | Peiler ......................................... 65/330 |
| 1,792,932 | 2/1931 | Rule . |
| 1,798,217 | 3/1931 | Noble ......................................... 65/221 |
| 1,926,764 | 9/1933 | Dorman . |
| 2,003,058 | 5/1935 | Stenhouse . |
| 3,248,204 | 4/1966 | Tyner ......................................... 65/362 |
| 3,582,309 | 6/1971 | Brucken ..................................... 65/328 |
| 3,711,266 | 1/1973 | Daly . |
| 4,478,631 | 10/1984 | Mumford . |
| 4,551,163 | 11/1985 | Duga et al. ................................ 65/129 |
| 4,554,000 | 11/1985 | Suomala . |
| 4,581,054 | 4/1986 | Mumford . |
| 4,793,849 | 12/1988 | Bratton . |
| 5,540,747 | 7/1996 | Scott .......................................... 65/328 |
| 5,693,114 | 12/1997 | Scott .......................................... 65/328 |

*Primary Examiner*—Steven P. Griffin

[57] ABSTRACT

A method of controlling the flow of glass through multiple orifices in which a plurality of closely spaced vertical plungers have cylindrical lower portions and oval upper portions. The upper portions of the plungers are engaged and supported in closely spaced side-by-side relationship in a clamping mechanism, in which each plunger is individually adjusted independently of the other plungers. The plungers are reciprocated simultaneously for controlling the flow of glass through the orifices.

1 Claim, 4 Drawing Sheets

METHOD OF CONTROLLING GLASS FLOW THROUGH MULTIPLE ORIFICES UTILIZING RECIPROCATING PLUNGERS

This application is a continuation of application Ser. No. 08/686,640 filed Jul. 24, 1996, now U.S. Pat. No. 5,693,114, which is a continuation of application Ser. No. 08/307,542 filed Sep. 16, 1994, now U.S. Pat. No. 5,540,747, which was a continuation of application Ser. No. 08/048,636 filed Apr. 19, 1993, now abandoned.

This invention relates to multiple orifice feed systems for producing glass gobs.

BACKGROUND AND SUMMARY OF THE INVENTION

In the manufacture of glass articles, it is common to provide a glass forehearth and multiple orifices which are controlled by reciprocable needles or plungers in order to provide the necessary uniform weight of gobs. Plural needles and orifices are utilized in order to maximize glass production.

Typical systems are shown in U.S. Pat. Nos. 1,529,948, 1,792,932, 1,926,764, 3,711,266, 4,478,631, 4,554,000, 4,581,054 and 4,793,849.

In such systems, the plungers are conventionally round in cross section. When the plungers are long, on the order of 30" to 48" long, with diameters about 2 to 2½" the strength of the plungers may not be adequate.

Among the objectives of the present invention are to provide a multiple orifice feed system wherein the plungers are configured such that they have greater strength and durability; wherein the increased strength is achieved without affecting the placement of the plungers; and wherein the plungers can be positioned in closely spaced relationship as desired.

In accordance with the invention, a multiple glass feed system is provided for use with a glass forehearth including a plurality of closely spaced plungers, each of which is individually adjustable relative to the other. The upper end of each plunger is oval in cross section and the lower end is round. The oval portions of the plungers are provided in side by side relation with the long axis of each oval portion being parallel to the long axis of the adjacent plungers.

DESCRIPTION

Figure 1:
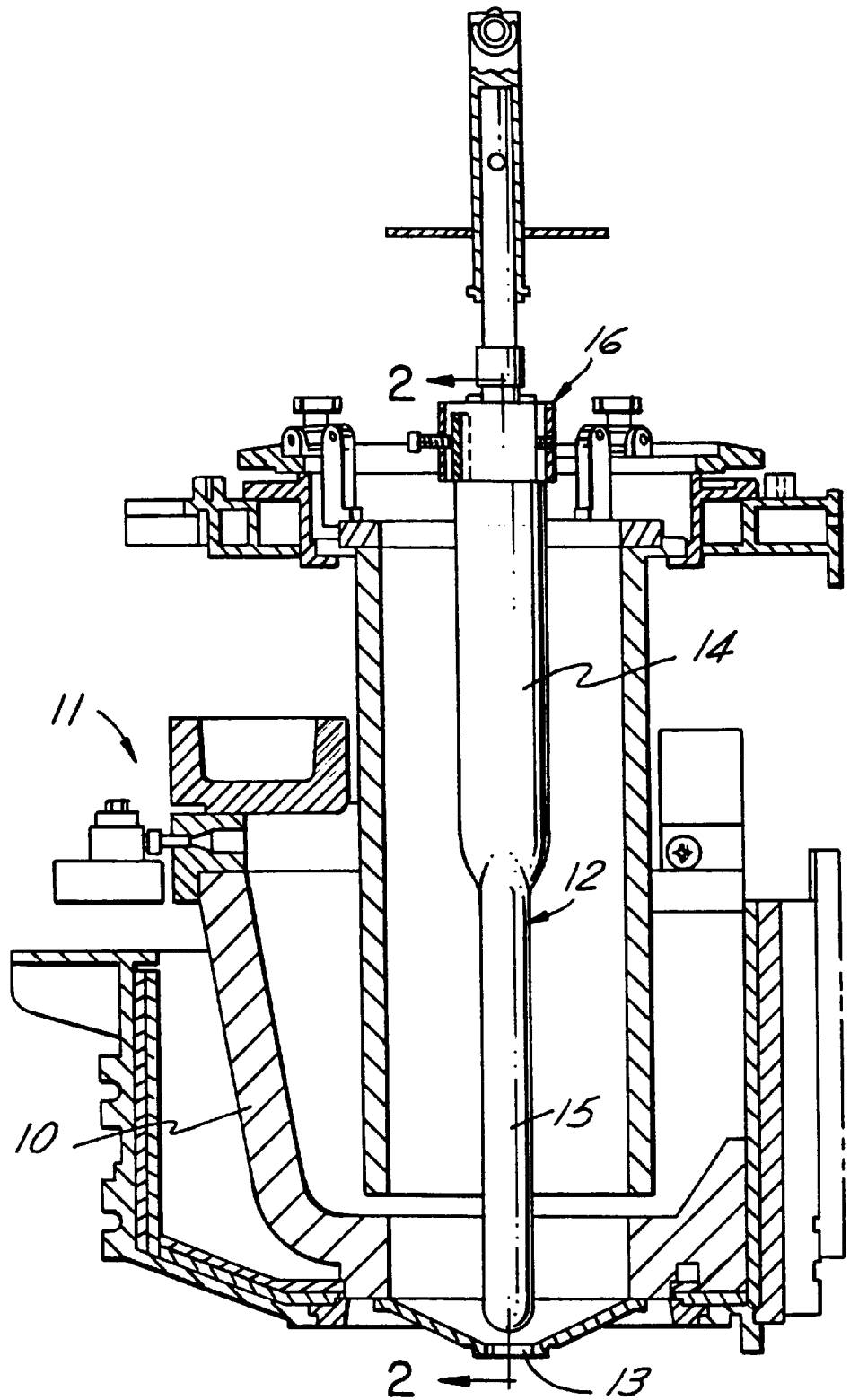
FIG. 1 is a part sectional elevational view of a multiple orifice feed system for producing glass gobs embodying the invention.
Figure 2:
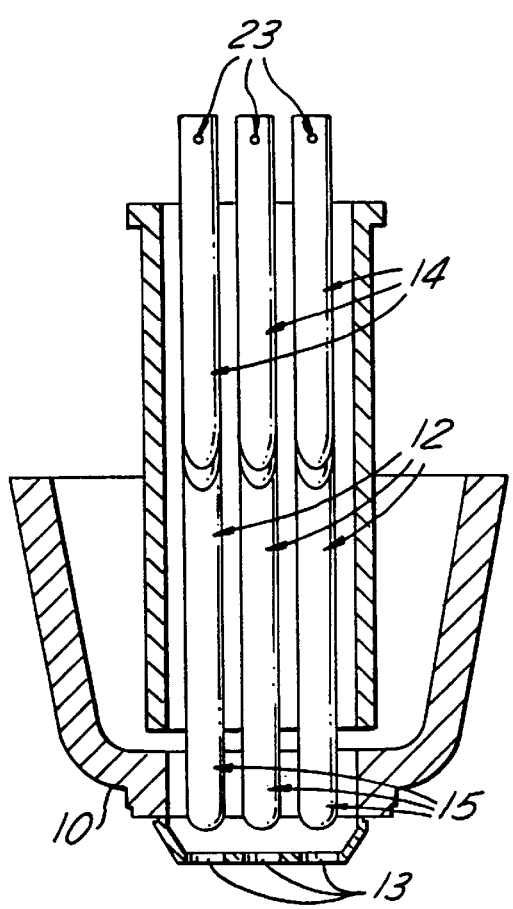
FIG. 2 is a vertical sectional view taken along the line 2—2 in FIG. 1.

Referring to FIG. 1, the multiple orifice glass feed system embodying the invention comprises a bowl 10 of a forehearth 11 and a plurality of vertical plungers 12 that function in connection with orifices 13. The plungers 12 are reciprocable to control the flow of glass out of the orifices 13 so that when associated shears, not shown, are used the size and weight of the gobs is consistent.

Figure 3:
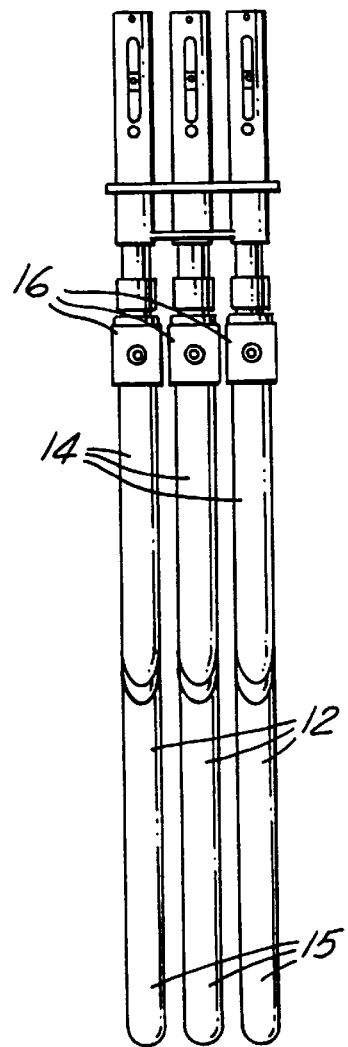
FIG. 3 is a side elevational view of the plungers, parts being broken away.
Figure 4:
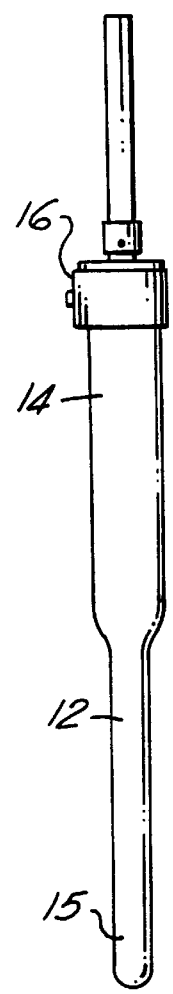
FIG. 4 is a front elevational view of a plunger shown in FIG. 1.
Figure 6:
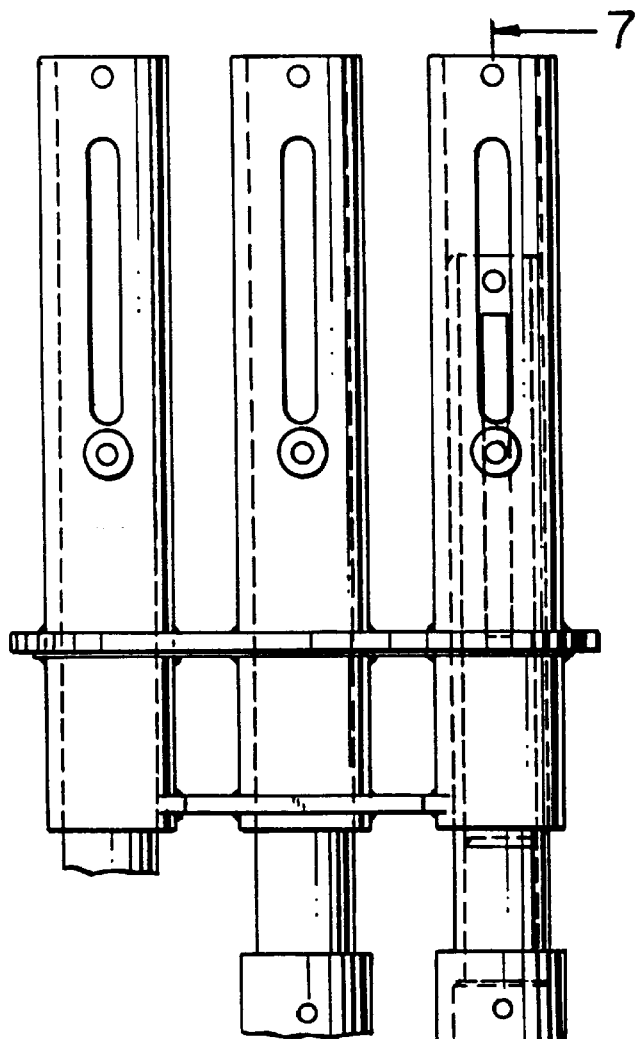
FIG. 6 is a fragmentary side view on an enlarged scale of a portion of the support mechanism for the plungers shown in FIG. 3.
Figure 5:
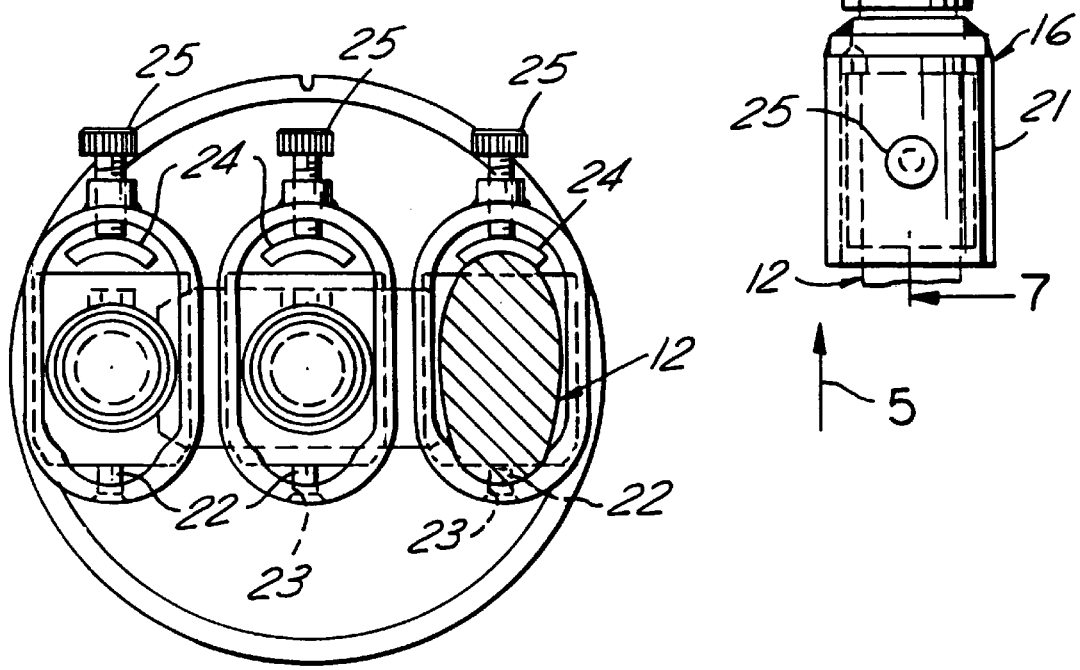
FIG. 5 is a fragmentary bottom view taken in the direction of the arrow 5 in FIG. 6 parts being broken away.
Figures 7, 8:
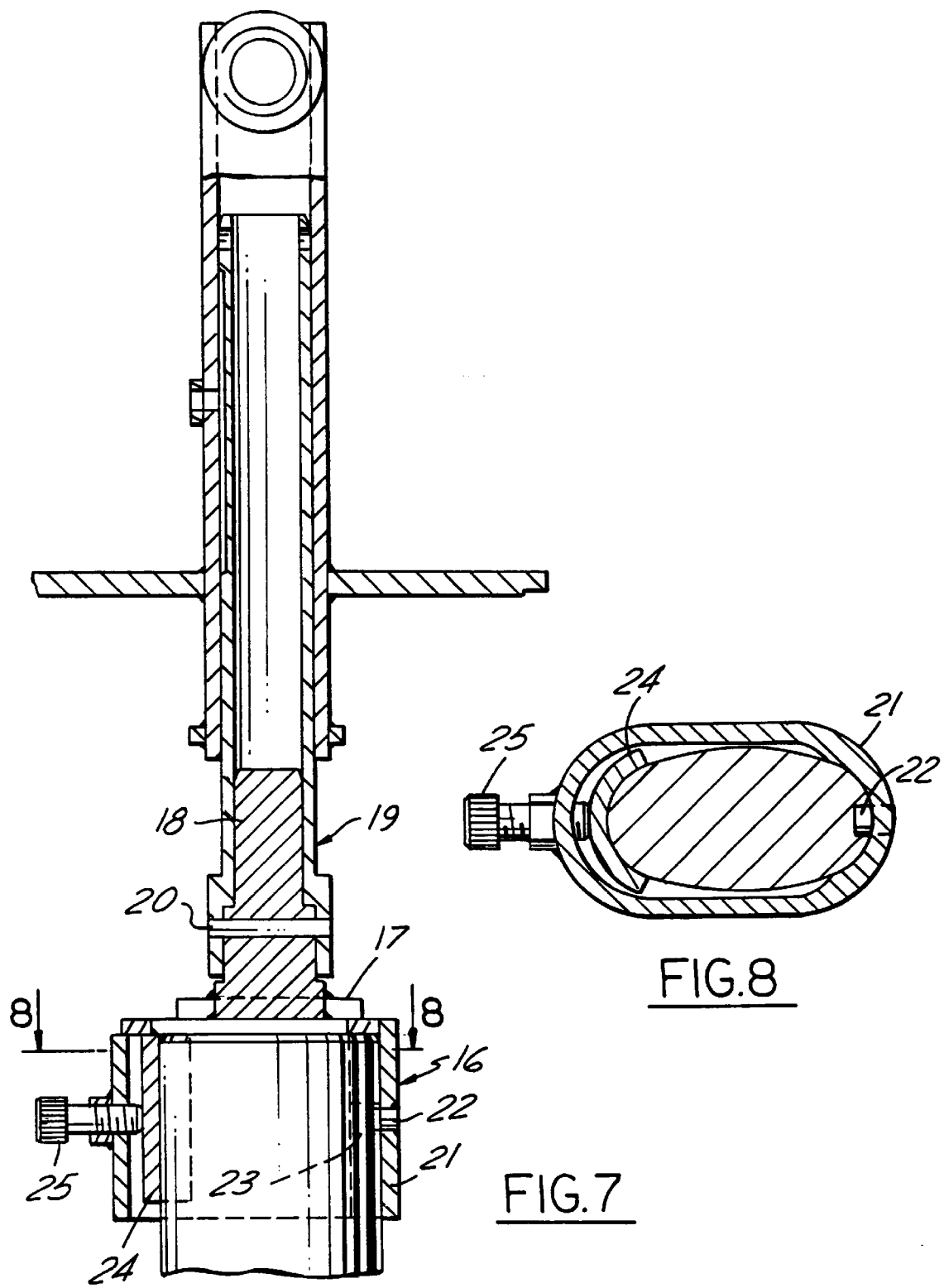
FIG. 7 is a fragmentary sectional view of a plunger taken along the vertical line 7—7 in FIG. 6.
FIG. 8 is a sectional view taken along the line 8—8 in FIG. 7.

In accordance with the invention, each plunger 12 has an upper portion that is oval in horizontal cross section and a lower portion 15 that is cylindrical in horizontal cross section. Each upper oval portion has a long axis. The plungers are supported by clamping mechanisms 16 in side by side relation with the long axis of the oval portion 14 lying in a plane with the planes of adjacent plungers 12 being parallel so that the plungers are in closely spaced relation (FIG. 3). The upper oval portion of each plunger has the same oval cross section. The cylindrical portions of each plunger have the same diameter. As a result, the strength and durability of the plungers is substantially increased. The lower ends of the lower portions 15 project into the forehearth 11 adjacent the orifices 13.

Referring to FIGS. 5–8, each clamping mechanism 16 comprises an upper plate 17 which has a connecting pin 18 fixed thereon and telescopically received in an actuator tube 19 and held therein by a pin 20. Each clamping mechanism 16 further comprises an oval chuck housing 21 which has a greater oval cross section than the oval upper portion 14 of the respective plunger 12. Chuck housing 21 includes a locating pin 22 in one end of the housing 21 having the smaller curvature. Pin 22 engages an opening 23 in the respective plunger 12. A liner piece 24 of small arcuate cross section corresponding to the other end of the oval portion 14 is Dressed to clamp the plunger 12 by a cap screw 25 threaded in chuck housing 21.

It can thus be seen that there has been provided a multiple glass feed system for use with a glass forehearth including a plurality of closely spaced plungers, each of which is individually adjustable relative to the other. The upper end of each plunger is oval in cross section and the lower end is round. The upper end of each plunger has the same oval cross section. The lower end of each plunger has the same diameter. The oval portions of the plungers are provided in side by side relation with the long axis of each oval portion being parallel to the long axis of the adjacent plungers.

I claim:

1. A method of controlling flow of glass through multiple orifices that comprises the steps of:
   (a) providing a plurality of orifices,
   (b) providing a plurality of closely spaced vertical plungers, each having a vertical axis, each said plunger having an upper portion of oval horizontal cross section and a lower portion of circular horizontal cross section,
   (c) supporting the upper portion of each said plunger by clamping said upper portion in a clamping mechanism individual to each said plunger, each said clamping mechanism including a curved linear plate for each said plunger, a housing having an oval cross section surrounding each said upper portion, and means extending between said housing and said linear plate to cause said plate to engage the upper portion of said plunger and clamp said plunger in said housing,
   (d) adjusting each said plunger relative to the others by adjusting the position of each said plunger relative to its clamping mechanism, and
   (e) reciprocating said plungers simultaneously for controlling flow of glass through said orifices.

* * * * *